United States Patent
Lima et al.

(10) Patent No.: US 7,794,601 B1
(45) Date of Patent: Sep. 14, 2010

(54) PYROLYTIC PRODUCTS FROM POULTRY MANURE

(75) Inventors: Isabel M. Lima, Mandeville, LA (US); Wayne E. Marshall, Corvallis, OR (US)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 84 days.

(21) Appl. No.: 12/082,593

(22) Filed: Apr. 11, 2008

Related U.S. Application Data

(63) Continuation of application No. 10/819,615, filed on Apr. 7, 2004, now abandoned.

(51) Int. Cl.
*C02F 1/42* (2006.01)

(52) U.S. Cl. .................. 210/688; 423/445 R; 502/416; 502/437

(58) Field of Classification Search ............. 423/445 R, 423/460; 502/416–439; 210/687–688, 679–680; 95/133–134, 273–287
See application file for complete search history.

(56) References Cited

U.S. PATENT DOCUMENTS

| | | | | |
|---|---|---|---|---|
| 3,778,387 A | * | 12/1973 | Urbanic et al. .............. | 502/401 |
| 3,887,461 A | * | 6/1975 | Nickerson et al. ........... | 210/669 |
| 4,584,405 A | * | 4/1986 | Vanderpool ................. | 564/479 |
| 7,524,795 B1 | | 4/2009 | Lima et al. | |

OTHER PUBLICATIONS

Dakiky, et al., Selective adsorption of chromium(VI) in industrial wastewater using low-cost abundantly available adsorbents, Advances in Environmental Research 2002; 6: 533-540.*

Rearden, et al., Demonstration of a Small Modular BioPower System Using Poultry Litter, DOE SBIR Phase-I Final Report (2001).*
Bilitewski, Production & Possible Applications of Activated Carbon From Waste, Recycling Berlin '70 International Congress, Berlin XI, 714-721.*
Bagreev, et al, Sewage Sludge-Derived Materials as Efficient Adsorbents for Removal of Hydrogen Sulfide, Environ. Sci. Technol. 2001; 35: 1537-1543.*
Shinogi, et al., Basic characteristics of low-temperature carbon products from waste sludge, Advances in Environmental Research 2003; 7: 661-665.*
Chen, et al., Physical and chemical properties study of the activated carbon made from sewage sludge, Waste Management 2002; 22: 755-760.*
Chiang, et al., Use of Sewage Sludge for Manufacturing Adsorbents, Canadian J. Chem. Eng. 1987; 65: 922-927.*
Tay, et al., A comparative study of anaerobically digested and undigested sewage sludges in preparation of activated carbons, Chemosphere 2001; 44: 53-57.*
Ko, et al., Optimised correlations for the fixed-bed adsorptions of metal ions on bone char, Chemical Engineering Science 2000; 55: 5819-5829.*
Shinogi, et al., Pyrolysis of plant, animal and human waste: physical and chemical characterization of the pyrolytic products, Bioresource Technology 2003; 90: 241-247.*
Shinogi, Yoshiyuki, et al., "Pyrolysis of plant, animal and human waste: physical and chemical characterization of the pyrolytic products", Bioresource Technology, 90, 2003, pp. 241-247.

* cited by examiner

*Primary Examiner*—Stanley S. Silverman
*Assistant Examiner*—Daniel C. McCracken
(74) *Attorney, Agent, or Firm*—John Fado; Randall E. Deck; Lesley Shaw

(57) ABSTRACT

Chars may be produced by carbonization or pyrolysis of poultry manure. Chars produced from poultry manure by the method described herein exhibit enhanced activity for metal ion adsorption.

8 Claims, No Drawings

PYROLYTIC PRODUCTS FROM POULTRY MANURE

BACKGROUND OF THE INVENTION

1. Field of the Invention

The present invention relates to the development and use of pyrolytic products or chars made from poultry manure that possess excellent adsorption properties, particularly with respect to the uptake of metal ions.

2. Description of the Prior Art

Pyrolytic products or chars are low porosity, low surface area materials that are intermediate products in the development of activated carbons. They are generally not used in industry for purification and chemical recovery operations as well as environmental remediation, as are the more structurally developed activated carbons. Toxic metals contamination of various water sources is a significant problem in many parts of the United States. Chars, which can be produced from a number of precursor materials including coal, wood and agricultural plant wastes, have not been examined for remediation of this problem. There are few if any commercial outlets for chars because of their inferior adsorption characteristics compared to activated carbon. While carbon production is an expanding industry in the United States, with a present production rate of over 400 million pounds a year and a growth rate of over 3% annually, char production is simply an intermediate step in carbon manufacture and has no significant presence in the marketplace.

The production of pyrolytic products, in the form of chars, is an age-old art. Char, when produced in the absence of air by non-oxidative carbonization or pyrolysis, is a relatively inactive material possessing a surface area limited to several square meters per gram. Chars are normally produced to reduce the volume and mass of a particular feedstock and provide a soil amender that improves the physical and nutritive properties through its ash content of hard, compact soils with a high clay content or highly porous soils with a high silica or sand content. Because chars have poorly developed internal structure, they adsorb few if any metal ions or organic compounds and non-polar materials from either liquid or gaseous media.

Chars, because of their association with activated carbon, traditionally have been made by pyrolysis of plant feedstock, from decomposed plant material such as coal to fresh plant material such as coconut shells and wood. Plant feedstock has a relatively high elemental carbon content, especially decomposed plant material, and elemental carbon yields derived from plant feedstock are considered acceptable in the carbon industry. Very few studies have evaluated animal waste as source of pyrolytic products. Animal waste generally has lower elemental carbon content and may produce lower char yields than plant material when both sources are pyrolyzed under the same time and temperature conditions. Chars derived from plant, animal, and human by-products have recently been shown to be porous materials that possess some useful nitrogen compounds and minerals such as calcium, magnesium, potassium, and phosphorus. Harmful substances, such as arsenic and metals such as mercury, lead, and cadmium, were shown to be present in very small concentrations.

Shinogi et al., in their paper entitled "Basic Characteristics of Low-Temperature Carbon Products from Waste Sludge" (*Adv. Environ. Res.*, 2003, 7, 661-665) prepared a pyrolysis product of cattle manure by heating to 380° C. in an atmosphere of limited air and reported the properties of the product. The pyrolysis product had a very low surface area of 2.2 $m^2/g$, an ash content of 25.6% and an elemental carbon content of 49.2%. The authors described the main use for the pyrolysis product as a soil amender due to the high phosphate ion, organic nitrate, and potassium ion content. In a second paper entitled "Pyrolysis of Plant, Animal and Human Waste: Physical and Chemical Characterization of the Pyrolytic Products" (*Biosresource Technol.* 2003, 90, 241-247), Shinogi et al. also described the production of pyrolyzed cattle manure over the temperature range of 250-800° C. in closed containers. Surface areas were low (<20 $m^2/g$) over this temperature range. The pyrolyzed cattle manure also had high ash content (up to 60%), a high pH (>10) and a total carbon content of less than 40%.

Bilitewski, in a paper entitled "Production and Possible Applications of Activated Carbon from Waste" (*Recycling Berlin, '79 Int. Recycling Cong.* Thome-Kozimiensky, Ed, Berlin V1, 1979, 714-721) produced carbon from poultry droppings by steam activation in a fluidized bed reactor. He reported that poultry droppings produced a carbon with a surface area of 60.5 $m^2/g$, elemental carbon content of 27.5% and an ash content of 52.4%. The author concluded that poultry droppings will yield only a very low grade carbon mainly due to its low surface area and high ash content.

Chen et al., in an article entitled "Physical and Chemical Properties Study of the Activated Carbon made from Sewage Sludge" (*Waste Management,* 2002, 22,755-760) used zinc chloride to chemically activate sewage sludge and evaluated select physical and chemical properties of the resultant activated carbon. The carbon had a surface area of 647 $m^2/g$ and was 38.9% elemental carbon. Additionally, the carbon had 5.18 meq/g oxygen-containing surface functional groups and possessed adsorption toward phenol and carbon tetrachloride.

Martin et al., in a publication entitled "Feasibility of Activated Carbon Production from Biological Sludge by Chemical Activation with $ZnCl_2$ and $H_2SO_4$" (*Environ. Technol.,* 1996, 17, 667-672) employed either zinc chloride or sulfuric acid to produce activated carbons from surplus biological sludge obtained from a wastewater treatment plant. Under optimal activation conditions, which was achieved with sulfuric acid, the activated carbon had a surface area of 257 $m^2/g$, an ash content of 38% and a yield of 34%. Removal of phenol using the optimally produced carbon was determined and found to be about 20% of the phenol removal capability of a commercial activated carbon.

Tay et al., in a publication entitled "A Comparative Study of Anaerobically Digested and Undigested Sewage Sludges in Preparation of Activated Carbons" (*Chemosphere,* 2001, 44, 53-57) reported on the zinc chloride activation of both digested and undigested sewage sludges. The results indicated that the undigested sludge had a higher carbon content and lower ash content and, accordingly, yielded a better activated carbon with a higher surface area, pore volume, carbon content and phenol adsorption capacity than its digested counterpart.

While various methodologies exist for the creation of activated carbons from plant or plant-derived material that are effective in the adsorption of metal ions, there remains a need to create lower cost pyrolytic products, such as chars, from alternate sources of carbonaceous material that are in great abundance and that have enhanced adsorption properties toward metal ions. We describe a method and product that provides chars from poultry manure with excellent metal ion adsorptive properties.

SUMMARY OF THE INVENTION

We have now developed a novel process for the creation of chars from poultry manure which possess enhanced activity for the adsorption of metal ions. The chars of this invention are produced by pyrolysis (also known as carbonization) of the manure. Chars produced from poultry manure by the method described herein possess a high active surface area, at least 145 m$^2$/g, a high phosphorous content, as high as approximately 6% by weight, and exhibit metal ion adsorption that far exceeds that of chars produced from other materials and even exceeds that of commercial activated carbons.

In accordance with this discovery, it is an object of the invention to provide a novel method for the creation of chars from poultry manure.

Another object of the invention is to provide chars from poultry manure with significant metal ion adsorbing capabilities.

A further object of this invention is to provide an economical process for the utilization of poultry manure.

Yet another object of the invention is to provide a value added product which may be derived from poultry manure.

Other objects and advantages of the invention will become readily apparent from the ensuing description.

DETAILED DESCRIPTION OF THE INVENTION

The present invention involves the creation of chars from poultry manure that possess enhanced adsorption ability for metal ions. In our copending U.S. patent application Ser. No. 10/784,049, filed Feb. 20, 2004 (the contents of which are incorporated by reference herein), we described the production of activated carbon from poultry manures. As disclosed therein, activated carbons are produced by pyrolysis or carbonization of the manure, producing a char, followed by activation of the char. We have unexpectedly discovered that chars produced by pyrolysis of poultry manure, without being subjected to subsequent activation, retain adsorption properties typically only associated with activated carbons. Moreover, these chars are particularly effective for adsorption of heavy metals from contaminated fluids. For example, without being limited thereto, in efficacy trials the chars of this invention have exhibited a $Cu^{2+}$ adsorption between 0.33 to 0.91 mmoles per gram of char. In contrast, chars produced from coal, coconut, or wood exhibited no detectable adsorption of Cue.

The carbon source for the chars of the present invention may be poultry manure from any one or a combination of chickens, turkeys, ducks, geese or quail, with manure from chickens and turkeys being preferred, and manure from broiler chickens being particularly preferred. While not wishing to be held thereto, it is believed that pyrolysis or carbonization of the manure entraps pre-existing phosphorous found in the manure, primarily in the form of phosphate ions within the carbon matrix, thus improving the char's metal ion adsorption properties. We have found that the chars produced from poultry manure in accordance with this invention possess a phosphorous content greater than approximately 2%, by weight, and as high as approximately 6%, by weight.

Poultry manure for use herein may be obtained from a variety of sources. Although the manure may be collected as droppings substantially free from other contaminating materials, as a practical matter it is envisioned that the manure will be poultry cake or litter. In this preferred embodiment, the poultry manure is typically supplied by a concentrated poultry facility operator after the floor of the facility has been cleaned by the operator. Normally, a partial cleaning yields what is known in the art as cake, and a more thorough cleaning of the facility yields litter. As used herein, cake is defined as material from a concentrated poultry facility that consists of bird droppings, feathers, and small amounts (<5%) of bedding material. Without being limited thereto, the bedding material is usually wood shavings, typically soft wood, such as pine. In terms of weight percentages it is typically about 80 or more percent droppings, 10 or more percent feathers, and 1-4 percent bedding material. Litter is defined as material from a concentrated animal facility that consists of bird droppings, feathers, and larger amounts of bedding material. In terms of weight percentages litter is typically about 60-70 percent droppings, about 10 percent feathers, and about 20-30 percent bedding material.

Although poultry manure may be subjected to pyrolysis directly, in the preferred embodiment the manure is first ground or milled, and pelletized. As noted above, cake or litter obtained from a poultry rearing facility are heterogeneous mixtures comprising a wide range of particle sizes. The manure is therefore preferably ground to a mixture of substantially uniform particle size, typically a powder. The degree of grinding may be varied, but is preferably to about 20 mesh (approximately 1 mm) or smaller particle size. The ground, powdered manure is then subjected to an optional, yet preferred pelletization. While chars may be produced from powdered manure, the resultant products are not suitable for use in columns due to the reduced void spaces in a powder filled column and resultant poor fluid flow characteristics.

Fresh poultry manure typically has a high moisture content making milling or grinding difficult. Thus, in the preferred embodiment the manure is first dried to a moisture content more suitable for grinding, preferably about 20±5% by weight. While lower moisture contents facilitate grinding, higher moisture contents are desirable for pelletization (manure at low moisture levels does not pelletize well and pellets so produced are readily friable). Therefore, following grinding, if the moisture content is too low the resultant powdered manure may be rehydrated to a moisture content suitable for producing hard, durable pellets from a pellet mill. In the preferred embodiment, the ground manure should have a moisture content between about 20 to about 30%. It is also envisioned that optional binders may be added to the manure to further facilitate pelletization, although adsorptive efficacy may be consequently reduced. Addition of binders to the manure may allow pelletization at lower moisture contents than otherwise necessary and may enhance durability. A variety of binders are known in the art and are suitable for use herein, including coal tar or wood tar, and natural product binders such as starches or molasses. Pelletization may be effected using equipment and techniques conventional in the art, and the size of the pellets is not critical and may vary. However, the preferred pellet size is between approximately 3/16 inch and 3/8 inch in diameter (for cylindrical pellets the length may also vary between approximately 3/16 to 3/8 inches).

Pyrolysis or carbonization is effected by heating the ground and pelletized manure for a period of time and under conditions effective to carbonize the poultry manure. In the preferred embodiment, the poultry manure is heated to a temperature range of about 700° C. to about 900° C., preferably between about 700° C. and about 800° C., under an inert, substantially oxygen-free atmosphere (e.g., nitrogen or other gas) for a time ranging from about 15 min to about 75 min, most preferably for about 45 to about 60 min. Using the conditions described hereinabove, we have produced chars having a BET surface area greater than 145 m$^2$/g, even as high as 333 m$^2$/g, and a largely microporous structure. In contrast, chars produced from coal, coconut, and wood have much smaller surface areas ranging between 6 to 308 m²/g. The phosphorous content of the chars so produced will vary somewhat with the particular starting material. For example, the estimated phosphorous content for chars produced (after acid washing) from chicken broiler cake (BC), broiler litter (BL), turkey cake (TC), and turkey litter (TL), varies between about 2 to 6%, by weight. At the conclusion of pyrolysis the chars should be allowed to cool, preferably to ambient temperature, before exposure to air.

Following pyrolysis, the resultant chars may be recovered for subsequent use. These chars are not subjected to activation, using either conventional or otherwise known techniques, or using the techniques described in our above-mentioned U.S. patent application Ser. No. 10/784,049, filed Feb. 20, 2004. Briefly, activation would typically require contacting the char with steam, or possibly $CO_2$ or other activation gas at an elevated temperature, flow rate, and time effective to remove any contaminants from the carbon matrix of the char. However, in a departure from our copending application, the char is not subjected to such activation.

Although the chars may be used directly following pyrolysis, the chars are preferably washed to remove ash remaining in the pores of the particle matrix. Although washing in this manner is optional, the efficacy of the chars may be reduced if such washing is omitted. The chars may be washed with a mineral acid, with 0.1 M HCl being the preferred acid and the preferred concentration. After acid treatment, the chars are rinsed with water one or more times, preferably two to four times, to remove excess acid and produce a char with a pH close to neutrality (i.e., a pH between 6.0-8.0). The chars are then dried at a temperature sufficient to reduce their moisture content to below approximately 5% by weight prior to use. The manner of drying is not critical, although drying under vacuum, at 80° C. for at least 6 hr is generally preferred.

While not wishing to be bound thereto, it is theorized that the pyrolysis conditions create planar sheets of graphite plates that can either stack upon each other or form "v-shapes". Interbonding of plates occurs by aliphatic dislocations (imperfection) of plates. The graphite plates create a lattice structure for the pyrolyzed manure that develop the carbon structure including the internal and external pore structures onto which substances can adsorb by forces called London dispersion forces. The hydrocarbon lattice is irregular in overall shape and repeatedly interrupted by the presence of pores or voids in the structure. During pyrolysis, inorganic constituents, such as phosphorus as phosphate, contained in the manure as part of its overall composition are either physically "trapped" or covalently (chemically) bound within the lattice structure and are generally difficult to remove through subsequent acid and/or water washing of the carbon.

It is further theorized that the presence of "trapped" or covalently bound phosphorus, which is primarily in the form of phosphate ion, can create centers of negative charge on the carbon at most pH values. Moreover, the centers of negative charge can readily adsorb or ionically bind positively charged ions such as metal ions, particularly those common metal cations such as those selected from the group consisting of Cu(II), Pb(II), Zn(II), Cd(II), Ni(II), Cr(III), Hg(II), Fe(II), Fe(III), Al(III), Co(II), Sn(II), Sn(IV), Ca(II) and Mg(II).

The chars of the invention may be utilized as an adsorbent in any application known in the art for which normal activated carbon is typically used. Moreover, these novel chars are particularly suited for the adsorption and/or recovery of any of the above-mentioned heavy metals from contaminated fluids such as water. In order to adsorb these metals or other contaminants, the fluid to be treated may be contacted with the chars by conventional methods typically used for treatment of fluids with activated carbons, such as but not limited to, a fixed bed, a moving bed, a fluid bed, a slurry-type or a batch-type contact stirring method. The contact period and conditions should be effective to allow adsorption of the contaminants into the pores of the char matrix, and may vary with the concentration of the contaminants, the particle size of the char, and the contact method, and may be readily determined by the user. Following contact with the char, the purified or otherwise treated fluid may be recovered.

The following examples are intended to further illustrate the invention and are not intended to limit the scope of the invention which is defined by the claims.

Example 1

In this and the following examples, all percentages are by weight unless otherwise specified.

Broiler cake and litter were obtained from the USDA-ARS, Poultry Research Unit, Starkville, Miss., and turkey cake and litter were obtained from Boeckmann Farms, California, Mo. These materials were dried to a moisture content of less than 20±5% and milled in a Retsch cross-beater mill (Glen Mills, Clifton, N.J.) to a particle size of less than US 20 mesh (<1 mm).

The broiler cake and litter and turkey cake and litter were pelletized in a PMCL5 Lab pellet mill (California Pellet Mill, Merrimack, N.H.) equipped with a 3/16 in die plate. The manure was brought to a moisture level of 20±5% by mixing the dried manure with water in a ribbon blender. Moisture content was monitored by using a Sartorius Moisture Analyzer model MA 51 (Sartorius, Brentwood, N.J.). The pellets produced were cylinders of 3/16 in diameter and 3/16 in length.

Pelletized poultry cake and litter were placed in a ceramic evaporating dish and placed in a Lindberg bench furnace equipped with a retort (Lindberg/Blue M, Waterton, Wis.). Pellets were pyrolyzed at either 700° C. or 800° C. for one hour under a flow of nitrogen gas set at a flow rate of 0.1 m³/hr. Chars were allowed to cool to room temperature overnight in the retort. Samples were washed with 0.1 M HCl and subsequently given three separate water washings before being dried overnight at 80° C.

The resulting chars were evaluated for select physical and chemical properties that include char yield, surface area, apparent (bulk) density, attrition (hardness) and pH.

Char yield was calculated by the following equation:

$$\text{Char yield}(\%) = [(Wt_c \div Wt_m) \times 100]$$

where $Wt_m$=dry weight in g of the manure and $Wt_c$=dry weight in g of the char.

Surface area measurements were obtained from nitrogen adsorption isotherms at 77° K using a Nova 2000 Surface Area Analyzer (Quantachrome Corp., Boynton Beach, Fla.). Specific surface areas ($S_{BET}$) were taken from adsorption isotherms using the Brunauer, Emmett, and Teller (BET) equation.

Apparent (bulk) density was determined by the following relationship:

$$\text{Bulk density}(g/cm^3) = Wt_c \div V_c$$

where $Wt_c$=the dry weight in g of the char of a particular particle size (18×40 US mesh) and $V_c$=the volume occupied by the char of particular particle size (18×40 US mesh).

Attrition (hardness) was determined by the following method: 3 g of 18-40 mesh granular char are placed in a 250 ml Erlenmeyer flask. Ten glass marbles of about 5 g each are also added to the flask, which is then continuously agitated at 200 rpm in an Aquaterm water bath shaker for 15 minutes at 25° C.

The char retained by a 40 mesh sieve is weighed and the percent attrition calculated as:

% Attrition=(wt. of char retained/initial sample wt.)× 100.

To measure the pH, 0.5 g of sample was placed in 50 ml of deionized water, covered with parafilm, and allowed to equilibrate by stirring at 300 rpm for 72 hr. Initial pH was then measured using a Thermo Orion pH meter.

TABLE 1

Select physical and chemical properties of poultry manure-based chars and chars made from traditional sources (coal, coconut shell, wood)

| Sample | Yield (%) | Surface area (m²/g) | Bulk density (g/cm³) | Attrition (%) | pH |
|---|---|---|---|---|---|
| Pyrolysis temperature = 700° C. | | | | | |
| Broiler cake | 40.3 | 318 | 0.54 | 15.1 | 8.6 |
| Broiler litter | 40.7 | 238 | 0.60 | 14.4 | 8.1 |
| Turkey cake | 40.8 | 147 | 0.53 | 10.7 | 9.2 |
| Turkey litter | 41.7 | 179 | 0.57 | 9.2 | 8.1 |
| Coal | 78.3 | 3.8 | 0.42 | 34.1 | 4.2 |
| Coconut shell | 27.6 | 35 | 0.61 | 20.5 | 6.6 |
| Wood | 25.3 | 301 | 0.38 | 23.4 | 5.1 |
| Pyrolysis temperature = 800° C. | | | | | |
| Broiler cake | 39.3 | 261 | 0.53 | 7.7 | 9.4 |
| Broiler litter | 39.4 | 199 | 0.62 | 7.7 | 9.1 |
| Turkey cake | 38.7 | 168 | 0.46 | 11.4 | 9.0 |
| Turkey litter | 39.1 | 206 | 0.55 | 7.8 | 9.3 |

Example 2

Chars as produced in Example 1 were analyzed for metal ion uptake using 20 mM solutions of cadmium chloride ($CdCl_2$), copper chloride ($CuCl_2$), nickel nitrate [$Ni(NO_3)_2$] or zinc chloride ($ZnCl_2$), which were made up in an 0.07 M sodium acetate-0.03 M acetic acid buffer (pH 4.8). One-quarter gram of char (18×40 US mesh) was stirred for 24 hr in 25 ml of the metal ion solution. The pH of the char suspension was recorded at the start and at the end of the experiment. Variations in pH between the start and end of the experiments were about 0.5 pH units. An aliquot of the suspension was drawn off in a disposable syringe, then filtered through a 0.22 μm Millipore filter (Millipore Corp., Bedford, Mass.) to remove any char particles. The sample was diluted 1:100 by volume with 4 vol % nitric acid ($HNO_3$, Ultrapure, ICP grade) and analyzed by inductively coupled plasma (ICP) spectrometry using a Leeman Labs Profile ICP-AES (Leeman Labs, Hudson, N.H.). The results are shown in Table 2.

TABLE 2

Metal ion adsorption of chars made from poultry manure and chars made from traditional sources (coal, coconut shell, wood)
Metal ion adsorption (mmol/g char)

| Sample | $Cu^{2+}$ | $Cd^{2+}$ | $Ni^{2+}$ | $Zn^{2+}$ |
|---|---|---|---|---|
| Pyrolysis temperature = 700° C. | | | | |
| Broiler cake | 0.91 | 0.64 | 0.10 | 0.96 |
| Broiler litter | 0.58 | 0.45 | 0.25 | 0.72 |
| Turkey cake | 0.33 | 0.46 | 0.25 | 0.62 |
| Turkey litter | 0.61 | 0.62 | 0.16 | 0.73 |
| Coal | 0.00 | 0.05 | 0.13 | 0.03 |
| Coconut shell | 0.00 | 0.04 | 0.13 | 0.10 |
| Wood | 0.00 | 0.03 | 0.20 | 0.05 |
| Pyrolysis temperature = 800° C. | | | | |
| Broiler cake | 1.05 | 0.80 | 0.13 | 0.80 |
| Broiler litter | 0.68 | 0.43 | 0.03 | 0.43 |
| Turkey cake | 0.77 | 0.64 | 0.15 | 0.64 |
| Turkey litter | 0.97 | 0.48 | 0.05 | 0.4 |

The values in Table 2 can be considered one-point adsorption capacities since 20 mM solutions are saturating concentrations of metal ions for the chars. The one point measurements are approximations of the true adsorption capacities that are obtained from adsorption isotherms.

Example 3

Chars as produced in Example 1 were analyzed for metal ion uptake using less than saturating concentrations of metal ions with 5 mM solutions rather than 20 mM solutions as in Example 2. The procedure of Example 2 was used. Values are given as percent metal ion adsorbed using 0.25 gram of char as calculated from the following equation:

% Metal ion adsorbed={[Total metal ion in solution (mmol)−metal ion in solution after adsorption (mmol)]/[Total metal ion in solution (mmol)]}× 100.

The results are shown in Table 3.

TABLE 3

Metal ion adsorption efficiencies of chars made from poultry manure and chars made from traditional sources (coal, coconut shell, wood)
Metal ion adsorption (% adsorbed) per gram of char

| Sample | $Cu^{2+}$ | $Cd^{2+}$ | $Ni^{2+}$ | $Zn^{2+}$ |
|---|---|---|---|---|
| Pyrolysis temperature = 700° C. | | | | |
| Broiler cake | 95.4 | 83.2 | 6.6 | 89.8 |
| Broiler litter | 95.0 | 82.3 | 5.1 | 90.9 |
| Turkey cake | 90.7 | 72.9 | 3.8 | 85.3 |
| Turkey litter | 97.1 | 89.0 | 4.5 | 93.4 |
| Coal | 0.0 | 12.8 | 0.5 | 2.6 |
| Coconut shell | 3.1 | 13.5 | 0.0 | 0.5 |
| Wood | 6.3 | 13.3 | 0.0 | 1.8 |
| Pyrolysis temperature = 800° C. | | | | |
| Broiler cake | 97.9 | 89.4 | 11.2 | 92.5 |
| Broiler litter | 86.9 | 59.9 | 6.0 | 75.7 |
| Turkey cake | 85.8 | 67.8 | 7.9 | 70.6 |
| Turkey litter | 97.4 | 89.1 | 10.6 | 89.1 |

Example 4

Chars as produced in Example 1 were analyzed for metal ion uptake using less than saturating concentrations of metal ions with 5 mM solutions rather than 20 mM solutions as in Example 2. However, the chars were placed in solutions containing each of the four metal ions at concentrations of 5 mM per metal ion. Therefore, total metal ion concentration in each solution was 20 mM. The procedure of Example 2 was used.

Values are given as percent metal ion adsorbed using 0.25 gram of char as calculated from the following equation:

$$\% \text{ Metal ion adsorbed} = \{[\text{Total metal ion in solution (mmol)} - \text{metal ion in solution after adsorption (mmol)}]/[\text{Total metal ion in solution (mmol)}]\} \times 100.$$

The results are shown in Table 4.

TABLE 4

Metal ion adsorption efficiencies of chars made from poultry manure and chars made from traditional sources (coal, coconut shell, wood)
Metal ion adsorption (% adsorbed) per gram of char

| Sample | $Cu^{2+}$ | $Cd^{2+}$ | $Ni^{2+}$ | $Zn^{2+}$ |
|---|---|---|---|---|
| Pyrolysis temperature = 700° C. | | | | |
| Broiler cake | 71.1 | 18.8 | 3.8 | 23.7 |
| Broiler litter | 66.1 | 18.1 | 3.6 | 25.2 |
| Turkey cake | 55.5 | 13.4 | 3.5 | 18.3 |
| Turkey litter | 73.1 | 15.0 | 3.6 | 18.1 |
| Coal | 0.6 | 0.3 | 0.7 | 1.0 |
| Coconut shell | 0.2 | 0.9 | 0.7 | 3.8 |
| Wood | 4.0 | 0.0 | 0.0 | 2.4 |
| Pyrolysis temperature = 800° C. | | | | |
| Broiler cake | 69.1 | 8.1 | 7.0 | 18.1 |
| Broiler litter | 39.6 | 4.9 | 10.8 | 11.0 |
| Turkey cake | 52.8 | 11.2 | 16.0 | 17.2 |
| Turkey litter | 51.4 | 10.9 | 14.4 | 17.4 |

It is understood that the foregoing detailed description is given merely by way of illustration and that modifications and variations may be made therein without departing from the spirit and scope of the invention.

We claim:

1. A process for treatment of fluids to remove heavy metals therefrom comprising contacting a fluid suspected of heavy metal contamination with a char for a period of time and under conditions effective for adsorption of heavy metals into said char, wherein said char comprises char produced by pyrolyzation of poultry manure without being subjected to activation.

2. The process of claim 1 wherein said poultry manure is selected from the group consisting of poultry cake and poultry litter.

3. The process of claim 1 wherein said pyrolyzation of poultry manure comprises heating said poultry manure for a period of time and under conditions effective to carbonize said manure.

4. The process of claim 1 further comprising recovering said fluid following said contacting with said char.

5. The process of claim 1 wherein said heavy metals are selected from the group consisting of Cu(II), Pb(II), Zn(II), Cd(II), Ni(II), Cr(III), Hg(II), Fe(II), Fe(III), Al(III), Co(II), Sn(II)mm Sn(IV), Ca(II), and Mg(II).

6. The process of claim 1 wherein said heavy metals are selected from the group consisting of Cu(II), Cd(II), Ni(II), and Zn(II).

7. The process of claim 6 wherein said poultry manure is pyrolyzation of poultry manure is in a substantially oxygen-free environment.

8. A process for treatment of fluids to remove heavy metals therefrom comprising:
    (a) providing a char produced by pyrolyzation of poultry manure without being subjected to activation; and
    (b) contacting a fluid suspected of heavy metal contamination with said char for a period of time and under conditions effective for adsorption of heavy metals into said char, further comprising washing said char produced by said pyrolyzation with mineral acid to remove ash therefrom, and rinsing the washed char with water.

* * * * *